United States Patent
Gupta

(10) Patent No.: US 8,261,310 B2
(45) Date of Patent: Sep. 4, 2012

(54) CROSS TABLE ANALYSIS DISPLAY

(75) Inventor: Jimmy Rohit Gupta, Burlington, NJ (US)

(73) Assignee: Triveni Digital, Inc., Princeton Jct., NJ (US)

( * ) Notice: Subject to any disclaimer, the term of this patent is extended or adjusted under 35 U.S.C. 154(b) by 1239 days.

(21) Appl. No.: 10/420,703

(22) Filed: Apr. 23, 2003

(65) Prior Publication Data

US 2003/0197732 A1  Oct. 23, 2003

Related U.S. Application Data

(60) Provisional application No. 60/374,524, filed on Apr. 23, 2002.

(51) Int. Cl.
*H04N 7/173* (2011.01)
*H04N 17/00* (2006.01)

(52) U.S. Cl. .......... 725/107; 725/38; 348/180; 348/184; 348/192; 709/224; 709/226

(58) Field of Classification Search .................... 725/38, 725/70, 107
See application file for complete search history.

(56) References Cited

U.S. PATENT DOCUMENTS

| | | | | |
|---|---|---|---|---|
| 5,901,289 A * | 5/1999 | Leonard et al. | ............... | 709/224 |
| 6,532,591 B1 * | 3/2003 | Arai et al. | ...................... | 725/132 |
| 6,604,110 B1 * | 8/2003 | Savage et al. | ................. | 707/102 |
| 6,754,906 B1 * | 6/2004 | Finseth et al. | .................. | 725/45 |
| 6,978,471 B1 * | 12/2005 | Klopfenstein | .................. | 725/50 |
| 7,215,360 B2 * | 5/2007 | Gupta | ........................... | 348/180 |
| 2004/0017831 A1 * | 1/2004 | Shen et al. | ..................... | 370/486 |
| 2004/0019910 A1 * | 1/2004 | Grenier et al. | ................. | 725/70 |
| 2004/0194149 A1 * | 9/2004 | Kessler | ......................... | 725/134 |

OTHER PUBLICATIONS

ATSC Program and System Information Protocol for Terrestrial Broadcast and Cable Doc. A65/A, Rev. A, May 31, 200.*

* cited by examiner

*Primary Examiner* — Jun Fei Zhong
(74) *Attorney, Agent, or Firm* — Fox Rothschild LLP; Perry M. Fonseca

(57) ABSTRACT

A method, system and computer program for providing a cross table analysis display in a digital broadcast environment, are discussed. The method includes providing at least two metadata tables of a broadcast stream, performing a cross table analysis on the metadata tables to determine consistency between the metadata tables, and displaying the result of the cross table analysis of the metadata tables using a graphical user interface.

21 Claims, 7 Drawing Sheets

Relationships Among PAT, PMTs, VCT, EITs and ETTs

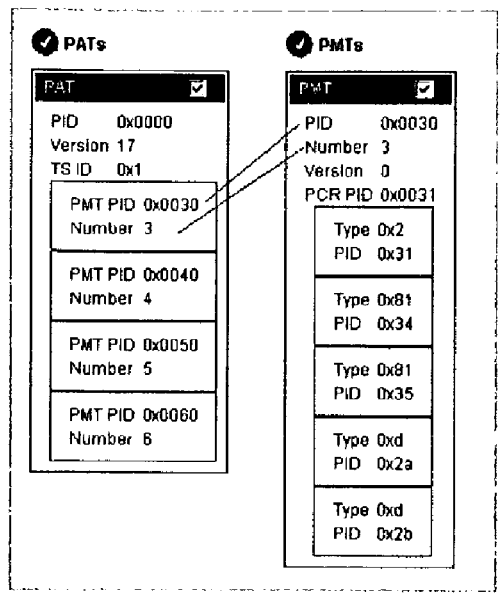
FIG. 2 PMT Consistent with PAT
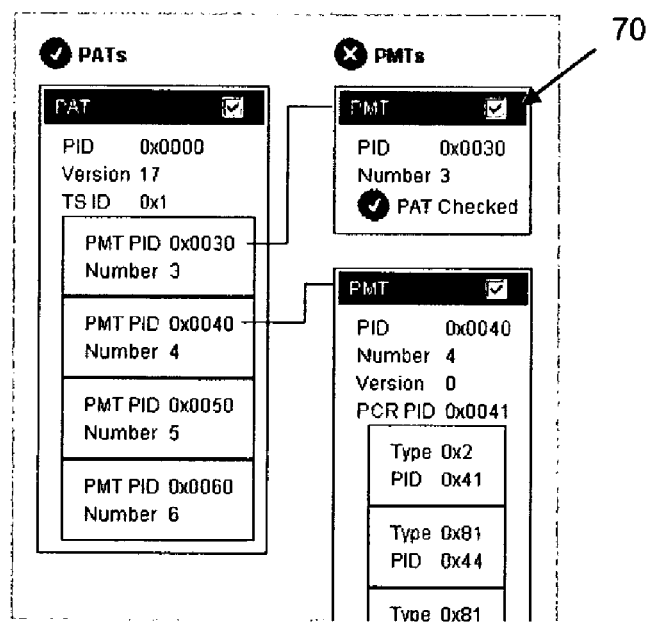
FIG. 3 Missing PMT

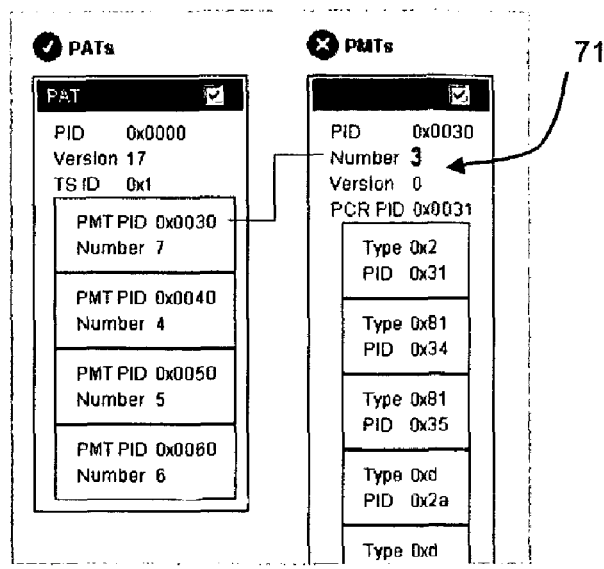
FIG. 4 PAT vs. PMT Program Number Not Matching
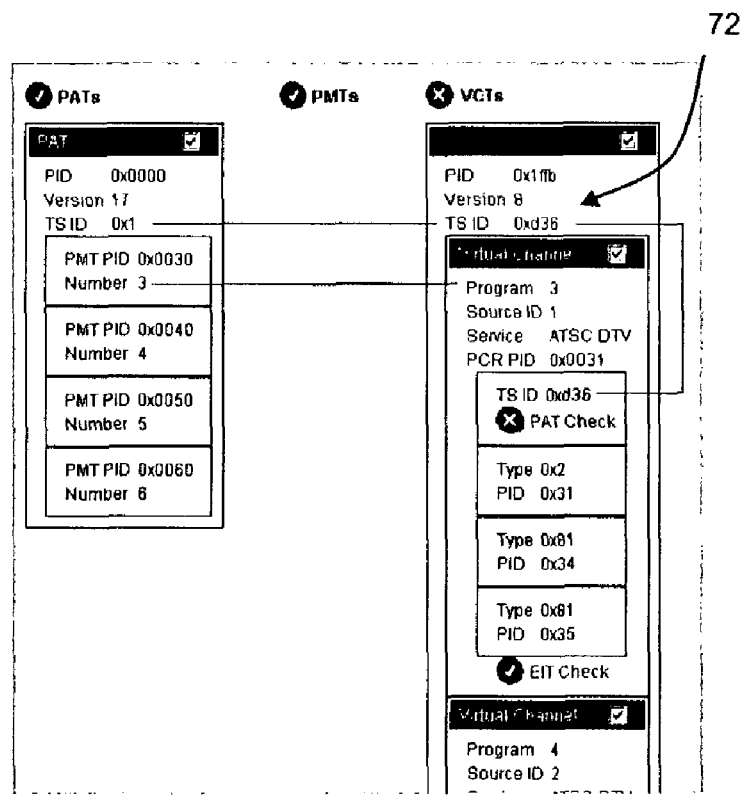
FIG. 5 VCT TSID Different from PAT TSID

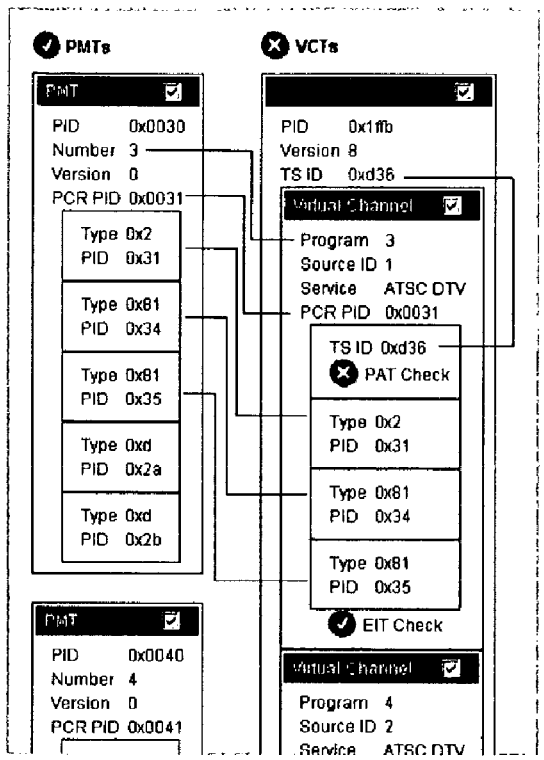
FIG. 6 VCT SLD Consistent with PMT Section
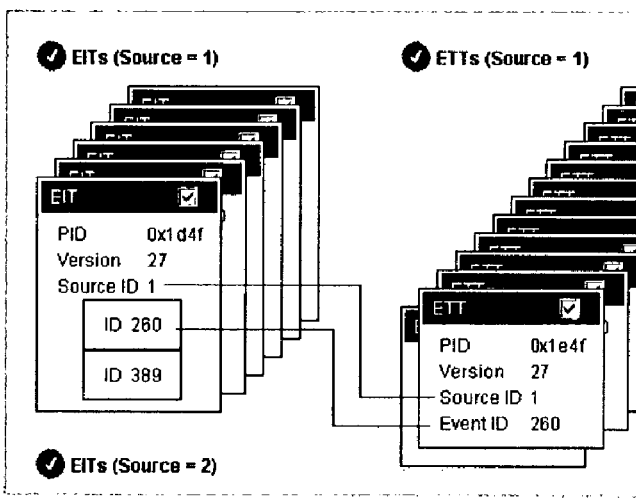
FIG. 7. ETT-k instance referencing event in EIT-k

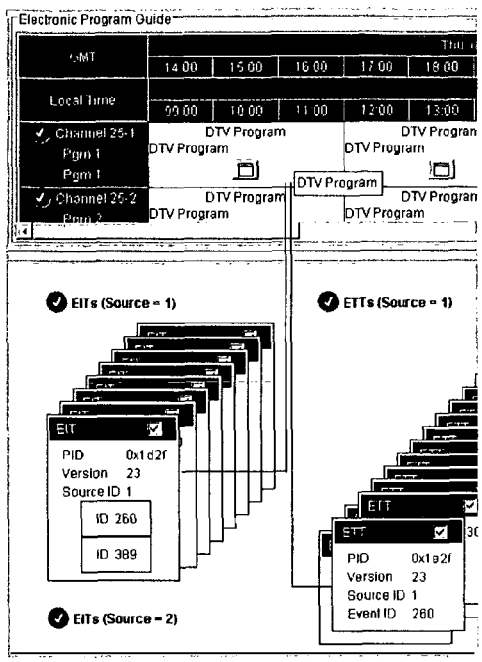
FIG. 8. Linkages among EPG, EIT, ETT
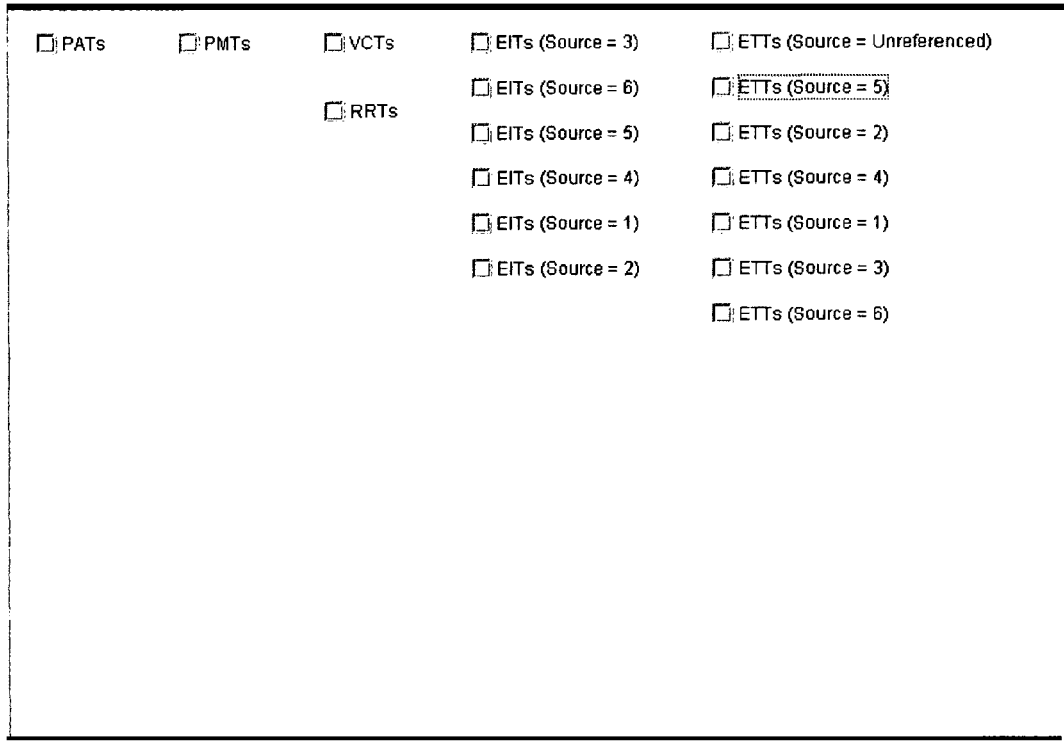
FIG. 9

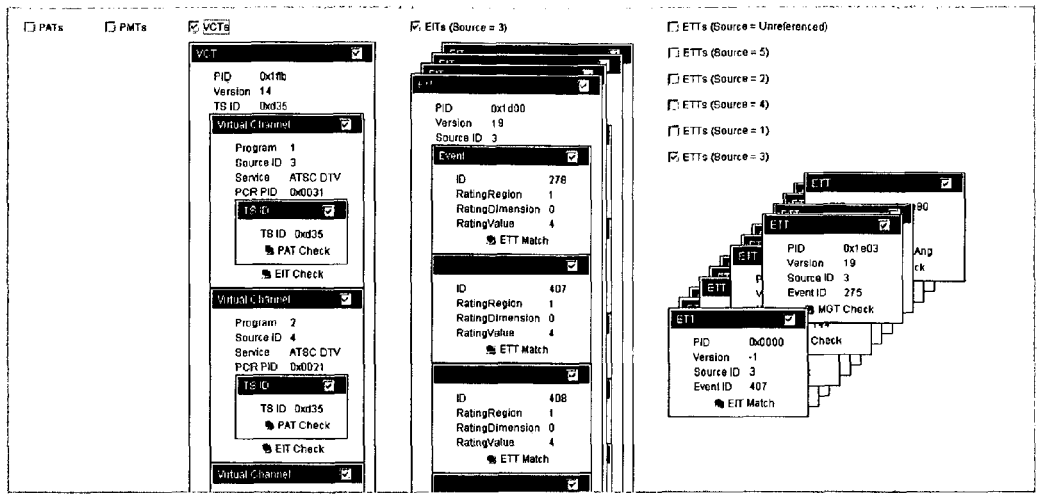
FIG. 12
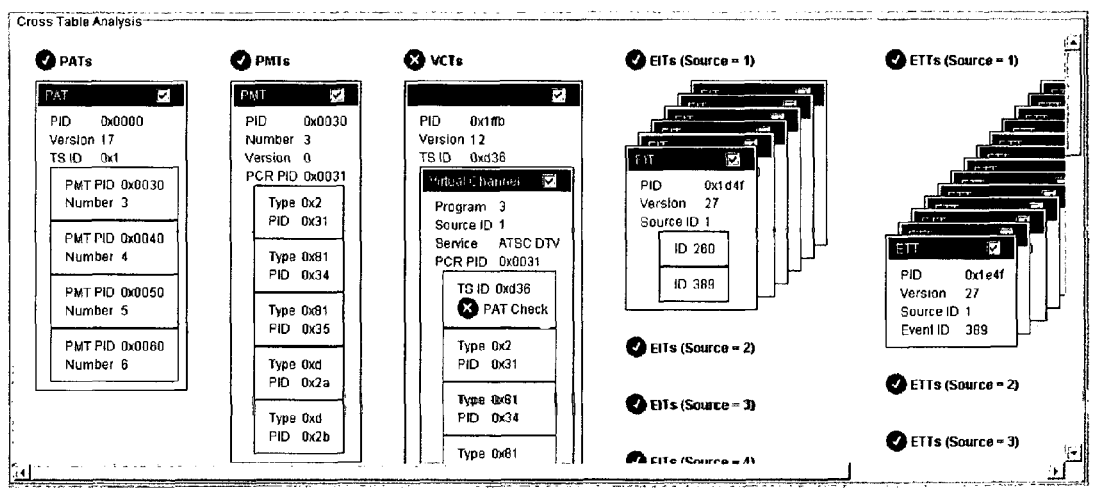
FIG. 13 Relationships Among PAT, PMTs, VCT, EITs and ETTs

CROSS TABLE ANALYSIS DISPLAY

CROSS TABLE ANALYSIS DISPLAY

The present application claims the priority benefit of U.S. Provisional Application No. 60/374,524 filed Apr. 23, 2002, the entire contents of which are herein fully incorporated by reference.

BACKGROUND OF THE INVENTION

1. Field of the Invention

The present invention relates to a cross table analysis display and more specifically, a technique of displaying cross table analysis of metadata tables provided in digital broadcast streams so as to view and check easily the consistencies and correctness of these tables.

2. Discussion of Background Art

As known, a digital television (DTV) broadcast stream is composed of a sequence of MPEG-2 transport stream packets. The broadcast stream may contain multiple virtual channels. Some of the virtual channels may be video channels, which contain a video stream and possibly one or more audio and/or data streams. Some may be audio channels, which contain at least one audio stream and possibly additional audio and/or data streams. Some may be data channels, which contain one or more data streams, but no video or audio. In the header of each transport stream packet there is a PID (packet identifier) field that identifies which stream that packet belongs to. A sequence of packets with a given PID value is often called a PID stream.

A DTV broadcast stream also contains some metadata that provide information about the virtual channels in the broadcast and the programming in those virtual channels. For ATSC DTV broadcasts, these metadata are defined in the MPEG-2 Systems Standard and the ATSC PSIP Standard. The PSI (Program Specific Information) tables defined in the MPEG-2 Systems Standard provide basic tuning information that allows a receiver to find out about the various virtual channels and their components. The PSIP (Program and System Information Protocol) tables defined in the ATSC PSIP Standard provide additional tuning information, plus other information that can be used by a broadcaster for branding and promotional purposes.

The PSI tables and the PSIP tables both list the virtual channels in the broadcast stream, identify the PID streams that make up each virtual channel, and give some information about these PID streams, such as the type of each stream (video, audio, or data). They also give the language of the audio streams, so that a receiver can select the language stream that matches the viewer preferences, as specified by the user during the set-up of the receiver.

The PSIP tables also provide information about the closed caption services, information about the content advisory rating (so-called "V-chip" rating) of the current programming, and information that allows viewers to select virtual channels by virtual channel number, rather than physical broadcast band. The PSIP tables also carry a short channel name, up to seven characters long, that will typically be displayed by receivers on the screen for several seconds when a viewer selects the channel, and will be used along with the virtual channel number to identify the channel in the receiver's on-screen electronic program guide (EPG), thereby helping broadcasters leverage their investment in branding their call letters.

As known, the MPEG-2 Systems Standard defines two primary PSI tables that are used for receivers to navigate through the virtual channels in the broadcast stream, and they are the PAT (Program Association Table) and the PMT (Program Map Table). The PAT contains a list of all the MPEG-2 programs (virtual channels) in the broadcast stream, and gives for each one its identifying program number and the PID stream where its PMT section can be found. The program number is a more or less arbitrary integer that acts as a unique identifier of the virtual channel within the broadcast stream.) The PAT also contains the transport stream id (TSID) of the broadcast stream, to uniquely identify it. The PAT itself is generally always in the PID stream with a PID value of 0, so receivers can always find it. The PAT is required to appear in the broadcast stream at least once every 100 milliseconds according to the MPET-2 Systems Standard.

The PMT is made up of a number of sections, one for each virtual channel in the broadcast stream. For ATSC broadcasts, each PMT section is in a separate PID stream. Each PMT section gives the program number for its virtual channel and lists all the program elements (PID streams) in the virtual channel. For each program element it gives the PID for the packets where it can be found and gives its stream type (video, audio, data). For any virtual channel that has a clock rate associated with it (video channels, audio channels, and some data-only channels), the PMT section also tells which PID stream contains the Program Clock Reference (PCR) values that are used to lock the receiver's decoding clock rate to the encoder clock rate. There may also be descriptors associated with the entire virtual channel or with individual program elements, giving additional information about the virtual channel and its components. Generally each PMT section is required to appear in the broadcast stream at least once every 400 milliseconds according to the MPET-2 Systems Standard.

The ATSC PSIP Standard and the ATSC Data Broadcast Standard define nine (9) PSIP tables that give various types of information about the broadcast stream: the MGT, STT, VCT, EIT, DET, ETT, DCCT, DCCSCT, and RRT. A brief discussion of each of these tables is provided below. All these tables and their interrelationships are known.

MGT (Master Guide Table)

The MGT serves as a roadmap to the other PSIP tables. For each table except the STT it gives the table's size and version number, and gives the PID stream where it can be found. If any PSIP table except the STT changes, then its version number in the MGT changes, and so the version number of the MGT changes. Thus, a receiver only needs to look at the version number field in the MGT to detect whether any PSIP tables have changed. The MGT generally always appears in the PID stream with a PID value of 0x1FFB, so receivers can always find it. Generally it is required to appear in the broadcast at least once every 150 milliseconds according to the ATSC PSIP Standard and the ATSC Data Broadcast Standard.

STT (System Time Table)

The STT gives the current UPC time, together with an indication whether daylight savings time is in effect and information as to when the next switch into or out of daylight time will take effect. It is generally always in the PID stream with a PID value of 0x1FFB and must appear in the broadcast at least once per second according to the applicable standards.

VCT (Virtual Channel Table)

As the name implies, the VCT contains information about the virtual channels in the broadcast stream. It may also optionally contain information about the broadcaster's associated analog TV channel and about virtual channels in other digital broadcast streams. The information about each virtual channel includes the short channel name, major and minor channel numbers, service type (analog TV, video DTV, audio DTV, or data-only DTV), flags indicating whether or not it is access controlled, whether or not it is currently on or off the air, and whether or not it is a hidden channel (for example, a channel intended only for test purposes, not to be tuned to by ordinary receivers), plus a Service Location Descriptor (SLD) that contains much the same information about the program elements in the channel as appears in the PMT section for the channel.

The VCT also includes some technical information about each channel that is intended for internal use by the receiver, not to be displayed to viewers. This includes the program number that appears in the associated PMT section, a source id that identifies the virtual channel uniquely within the VCT and is used to link programming information in the EITs and ETTs to the associated virtual channel, a channel TSID (transport stream ID) that is used to distinguish channels in this broadcast stream from analog channels or digital channels in other broadcast streams, and an ETM location flag that indicates whether an extended text description of the channel appears in the broadcast stream containing the VCT, or in the broadcast stream containing the channel itself (for channels in other digital broadcast streams), or is not provided at all.

The VCT also contains in its header the TSID of the transport stream in which it appears, which must match the TSID in the PAT. Generally the VCT always appears in the PID stream with a PID value of 0x1FFB, and it must appear at least once every 400 milliseconds according to the known standards.

EIT (Event Information Table)

The EIT is generally a collection of up to 128 tables, designated EIT-0 through EIT-127, each of which is in a separate PID stream. Each EIT-k in turn includes multiple EIT-k instances (sub-tables), one for each virtual channel in the broadcast stream. Each EIT-k instance contains information about the events in a single virtual channel during a x-hour period such as a 3-hour period.

The information about each event includes the title, start time, duration, ETM location flag, source id to identify the virtual channel containing the event, and an event id to identify the event itself (within the scope of the source id). It may also include a content advisory descriptor, caption service descriptor, AC-3 audio descriptor, and redistribution control descriptor. It is likely that in the near future a new standard will add a content identification descriptor to this list.

The PID for each EIT-k is given in the MGT. The PSIP Standard recommends that EIT-0 appear at least once every 500 milliseconds, but this is not required. The standard also requires that at least EIT-1 through EIT-3 be present in the broadcast stream, but no cycle time is recommended for them.

DET (Data Event Table)

The DET is exactly like the EIT, except that it is used to describe events in data services, rather than in video or audio services, and each instance has a data id, rather than an event id. The DET is required for channels whose service type is digital data service, and it may optionally be used for data-enhanced digital video or audio channels. The DET is used for data-enhanced video or audio channels only when it is desired to provide descriptions for the data service that are independent of the descriptions for the video or audio service in the same channel.

ETT (Extended Text Table)

The ETT is generally a collection of up to 257 tables. These are designated event ETT-0 through event ETT-127 (to describe events in the corresponding EITs), data ETT-0 through data ETT-127 (to describe events in the corresponding DETs), and a channel ETT (to describe virtual channels). Each of these is in a separate PID stream. Each event ETT-k or data ETT-k may include multiple ETT-k instances, one for each event in the corresponding EIT-k or DET-k; i.e., each ETT-k instance contains a textual description of a single event. The channel ETT may include multiple channel ETT instances, one for each virtual channel.

Each ETT-k instance contains a source id and an event id to identify the event, and a so-called multiple string structure that contains the textual description of the event, possibly in multiple languages. The MGT gives the PID for each event ETT-k, each data ETT-k and the channel ETT. None of the ETTs are required.

DCCT (Directed Channel Change Table)

The DCCT contains a collection of directives asking receivers to change channels, either unconditionally or based on various geographic, demographic, or viewer preference factors. Each directive contains a dcc from channel and a dcc to channel, identified by virtual channel numbers, a dcc start time and dcc end time, and a specified set of conditions that determine whether the directive should take effect or not. If the receiver is tuned to the dcc from channel, and the current time is between the dcc start time and the dcc end time, and the specified conditions are satisfied, then the receiver should switch to the dcc to channel. Every virtual channel used as a dcc from channel or dcc to channel in a DCC directive must be in the VCT according to the known standards.

DCCSCT (DCC Selection Code Table)

The DCCSCT carries general code definitions and/or state and/or county location code definitions for use in extending the original sets of codes defined in the initial version of the standard. Generally it will only be used if such extensions are needed to accommodate future versions of the standard.

RRT (Rating Region Table)

The RRT carries descriptions of the content advisory systems used to rate the events in the broadcast stream. Different countries may have different content advisory systems defined for them. ATSC has recommended that the rating system for the United States not be carried in the broadcast stream, since it is not intended to ever be modified. Thus, generally the RRT is omitted for stations whose viewing area is completely with the United States.

Television stations that are integrating PSIP/PSI (or other metadata) tables into their broadcast streams using DTV broadcast equipment such as encoders, PSIP generators and data servers, need a way to verify that the stream they are producing complies with the relevant ATSC and MPEG-2 standards, or other applicable standards. Thus, there is a great need to check the correctness and consistency of the PSIP and PSI tables according to the appropriate standards on a continuous basis. If these tables are not present in the broadcast stream, or if they are incorrect or inconsistent, receivers may act unpredictably or even lock up while tuning to a station, thereby causing errors or malfunctions in the system.

Particularly, there are several types of cross table consistency that need to be checked. One table may reference another table, in which case the presence of the referenced table in the broadcast stream must be checked. One table may reference information in another table, in which case the presence of the referenced information must be checked. A specific field of one table may contain the same information as a specific field of another table, in which case it should be verified that the information in the two fields match.

SUMMARY OF THE INVENTION

The present invention is directed to a method, system and computer program for providing a cross table analysis display in a digital broadcast environment, so that any inconsistency between the metadata tables can be easily detected.

According to an embodiment of the present invention, a method of providing a cross table analysis display in a digital broadcast environment, includes providing at least two metadata tables of a broadcast stream, and displaying a result of a cross table analysis of the metadata tables using a graphical user interface.

According to an embodiment of the present invention, a computer program product embodied on at least one computer-readable medium, for providing a cross table analysis display in a digital broadcast environment, includes computer-executable instructions for: accessing at least two metadata tables of a broadcast stream, and displaying a result of a cross table analysis of the metadata tables using a graphical user interface.

According to an embodiment of the present invention, a system for providing a cross table analysis display in a digital broadcast environment, includes a mechanism to provide at least two metadata tables of a broadcast stream, and a display unit to display a result of a cross table analysis of the metadata tables using a graphical user interface. Also provided is a means for providing at least two metadata tables of a broadcast stream and means for displaying a result of a cross table analysis of the metadata tables using a graphical user interface.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will become more fully understood from the detailed description given hereinbelow and the accompanying drawings which are given by way of illustration only, and thus do not limit the present invention.

FIG. 2 is one example of a cross table analysis display between a PAT and a PMT according to an embodiment of the present invention.

FIG. 3 is another example of a cross table analysis display between a PAT and a PMT according to an embodiment of the present invention.

FIG. 4 is one example of a cross table analysis display between a PAT and a PMT program number according to an embodiment of the present invention.

FIG. 5 is one example of a cross table analysis display between a VCT TSID and a PAT TSID according to an embodiment of the present invention.

FIG. 6 is one example of a cross table analysis display between a VCT SLD and a PMT according to an embodiment of the present invention.

FIG. 7 is one example of a cross table analysis display between an ETT and an EIT according to an embodiment of the present invention.

FIG. 8 is one example of a cross table analysis display between an EPG, an EIT and an ETT according to an embodiment of the present invention.

FIG. 9 is one example of a cross table analysis display at a consolidated high level view according to an embodiment of the present invention.

FIGS. 10-13 are various examples of a cross table analysis display for various tables at a consolidated view according to the embodiments of the present invention.

DETAILED DESCRIPTION OF THE PREFERRED EMBODIMENTS

The present invention displays the instances of the relevant PSI and PSIP tables graphically, and uses color coding and/or some other schemes to indicate relationships among the tables and any cross-table consistency errors that may be present.

According to an embodiment of the present invention, a display can be presented that simply lists the different types of PSI and PSIP tables, and indicates with, e.g., green checkmarks and red X-marks which table types are involved in any inconsistencies. The user can select which types of tables to display, so as not to clutter up the display screen with tables that are not involved in the problem.

According to an embodiment of the present invention, tables can be represented normally in some neutral color, e.g., white rectangles with a blue border containing black text for key field values. If a table instance is missing, than a pseudo-table (e.g., a block) can be displayed to represent the missing table, using a sharply contrasting color scheme, e.g., white with a red border. Similarly, if a block of data within a table is missing, then a pseudo-block can be included in the table to represent the missing block. If field values do not match when they are supposed to, then the incorrect values can be highlighted in some conspicuous way, e.g., by showing the field values in red.

When the user selects any table instance or block of data in the display, that table instance (or data block) is highlighted in some conspicuous way, e.g., in yellow, and all table instances and blocks of data that are linked to the selected item by consistency conditions can also be highlighted in the same or similar way.

Figure 1:
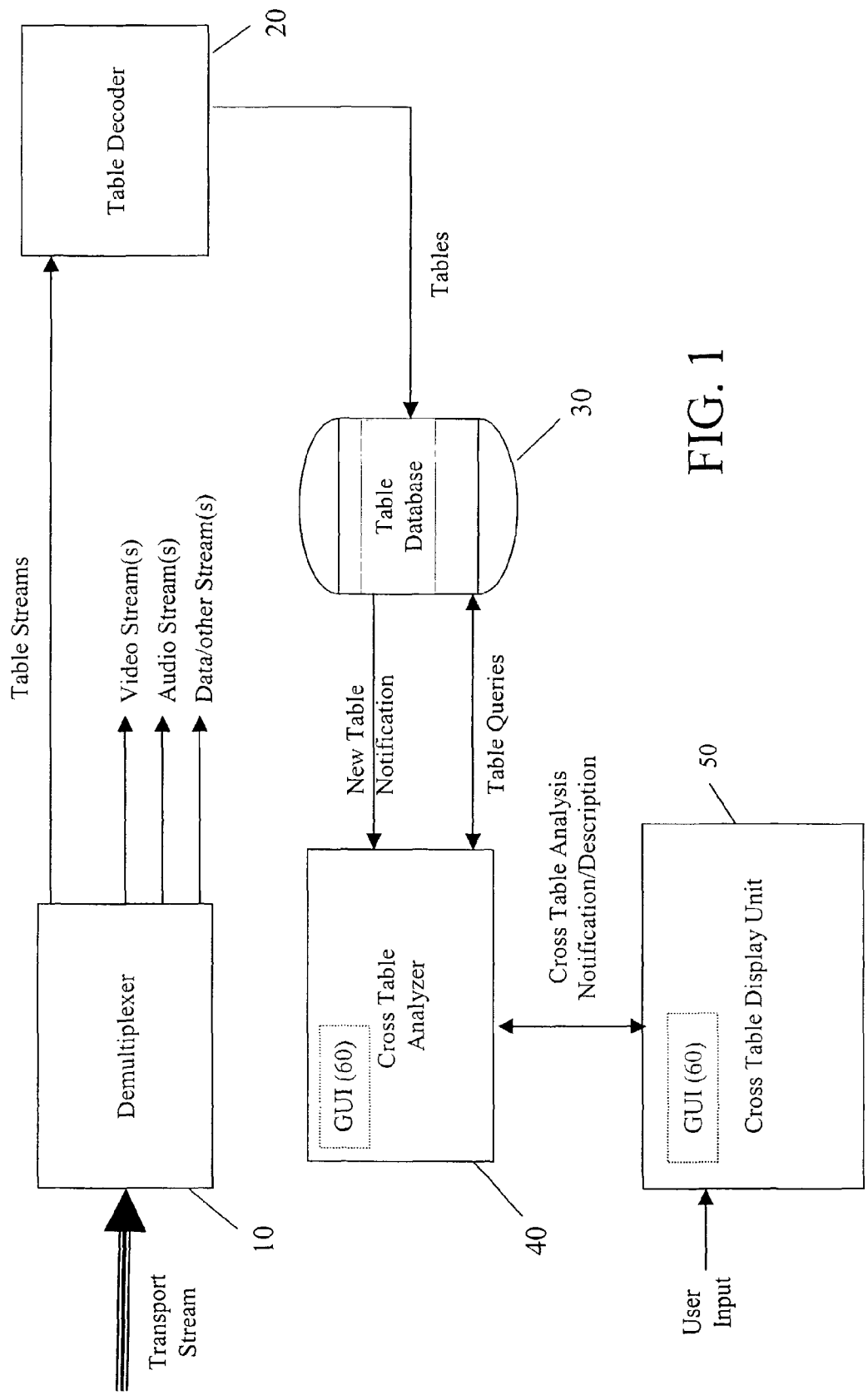
FIG. 1 is an example of a block diagram of a system for providing cross table analysis displays according to an embodiment of the present invention.

FIG. 1 shows an example of a block diagram of a system for providing cross table analysis displays according to an embodiment of the present invention. This system can be implemented in any suitable environment in which the cross table analysis and displays are desired, e.g., at a cable head-end, a set top box manufacturing system, etc.

As shown in FIG. 1, the system for providing cross table analysis displays includes a demultiplexer 10, a table decoder 20, a table database or storage 30, a cross table analyzer 40, and a cross table display unit 50, all operatively coupled. In another embodiment, the cross table analyzer 40 and the display unit 50 may be combined into one unit.

The demultiplexer 10 receives transport streams (e.g., in DTV broadcast streams) and demultiplexes them to provide video stream(s), audio stream(s), data stream(s), and table stream(s). Such streams are all known. The table decoder 20 receives the table streams from the demultiplexer 10 and decodes them using known techniques. The tables output from the table decoder 20 are then stored in the database 30 and are accessed by the cross table analyzer 40. The cross table analyzer 40 analyzes the interrelationship between these tables to check for the consistency and correctness between the tables. Such analysis is performed using the table relationships established according to the applicable standards such as ATSC PSI Standards, MPEG-2 Systems Standards, etc. Such analysis can be performed in real time or non-real time as needed, and can also be performed automatically and systematically for all the incoming tables, or selectively for certain tables.

The result of the cross table analysis is output to the cross table display unit 50 which displays the result. The cross table display unit 50 can be a monitor, a screen, or any other display means.

The cross table display unit 50 or the cross table analyzer 40 is equipped with a graphical user interface (GUI) 60 such that the cross table display unit 50 and/or the cross table analyzer 40 can receive and process a user's inputs such as a command to analyze certain tables, a command to view a particular table containing an error, etc. Any existing GUI technique can be used.

The following sections describe various inconsistencies within the tables that are detected and discuss examples of how this graphical technique can be used to highlight them according to the present invention. It should be understood that these are mere examples and other elements of the same or different tables may be compared to check for the consistencies.

The displays shown in FIGS. 2-13 are examples of cross table analysis displays which can be displayed on the display unit 50 of FIG. 1 according to the cross table analysis results of the cross table analyzer 40. But other devices or systems may be used to provide the cross table displays of the present invention.

PAT vs. PMT Consistency

The PAT carries information indicating what PMT sections are supposed to be present, what PID stream each PMT section is supposed to be in, and the program number each PMT section is supposed to have. The cross table analyzer 40 examines the PAT, obtains information about the PMTs from the PMT, and then compares the actual PMT sections with the PMT information obtained from the PAT, to determine whether the PAT and PMTs are consistency with each other. The result of this analysis is displayed on the display unit 50.

FIGS. 2, 3 and 4 provide three different examples of a cross table analysis display where the PAT and PMTs are compared. Specifically, FIG. 2 illustrates an exemplary situation where a referenced PMT section is indeed present in the correct PID stream and has the correct program number. In this example, the user has selected a PMT section, so that section and the corresponding program block in the PAT are highlighted in yellow. FIG. 3 illustrates an exemplary situation where a PMT section is not present in the designated PID stream. In this example, a pseudo-table 70 with a red border represents the missing table. FIG. 4 illustrates an exemplary situation where a referenced PMT section is present in the designated PID stream, but it does not have the correct program number. The incorrect program number in the PMT is indicated to the user using the red colored text 71. Other examples are possible.

PAT vs. VCT Consistency

The TSID field in the PAT should match the field by the same name in the header of the VCT. Also, each MPEG-2 program listed in the PAT should appear as a virtual channel in the VCT. If these consistency conditions are not met (which can happen fairly easily, for example, if the PAT is generated by the multiplexer and the VCT is generated by the PSIP generator), some DTV receivers can ignore the VCT. This will have a negative impact on both tuning and EPG functions. Thus, to avoid this situation, the cross table analyzer 40 checks the TSID field in the PAT with the corresponding TSID field in the VCT, and indicates on the display unit 50 whether or not these TSID fields match.

FIG. 5 illustrates an example of such a cross table analysis display indicating that the TSID in the VCT does not match the TSID in the PAT. In this example, the TSID in the header of the VCT is highlighted with the red colored text 72. Other examples are possible.

PMT vs. VCT Consistency

The Service Location Descriptor (SLD) for a virtual channel in the VCT must contain all the audio and video streams that appear in the PMT section for the MPEG-2 program corresponding to the virtual channel. It may contain some or all of the data streams that appear in the PMT section as well, if any, but this is not required. However, all the streams that appear in the SLD must appear in the corresponding PMT section. Moreover, the PCR_PID value in the PMT section must be equal to the PCR_PID value in the SLD, the PIDs and stream types of corresponding streams in the PMT section and SLD must be the same, and if an ISO__639_language_ descriptor appears in the descriptor loop for a stream in the PMT section, then its language code must match the language code in the corresponding program element in the SLD. Thus, the cross table analyzer 40 checks for the above information in the PMT and VCT to determine whether they are consistent with each other. The result of the analysis is displayed on the display unit 50.

FIG. 6 illustrates an example of such a cross table analysis display indicating that an SLD in a VCT is consistent with the corresponding PMT section and the user has selected the stream in the PMT with PID 0x0034. In this example, both the stream in the PMT and the corresponding stream in the SLD of the VCT are highlighted in yellow. Other examples are possible.

EIT/DET vs. VCT Consistency

Each EIT-k or DET-k table instance contains in its header the source id of the virtual channel for which the EIT-k or DET-k is providing event information. This value must appear as the source id of some virtual channel in the VCT. Otherwise EPG applications have no way to know which channel the EIT-k or DET-k is associated with, and the EIT-k or DET-k will typically be ignored. When the cross table analyzer checks the ETI/DET and the VCT and if an EIT-k or DET-k instance appears with a source id that does not appear in the VCT, this can be represented by a pseudo-channel block with a red border appearing in the VCT (in the same or similar way as the above discussed cross table analysis displays), with the source id of the pseudo-channel set equal to the source id of the orphan EIT-k or DET-k instance.

ETT vs. EIT/DET/VCT Consistency

Each ETT-k table instance has an ETM_id that references the source id and the event id (or data id, for a data ETT) of the event that it describes. These values must appear as the source id and the event id (or data id) of some event in EIT-k (or DET-k). Otherwise EPG applications would not be able to tell which event the ETT-k table instance is describing, and they will typically ignore the ETT-k instance. Similarly, each channel ETT instance has an ETM_id that references the source id of the channel it describes. This value must appear as the source id of some virtual channel in the VCT, or EPG applications will typically ignore the channel ETT instance. Thus, the cross table analyzer 40 checks the ETT and EIT/DET/VCT for the above information to determine whether they are consistent with each other. The result of the analysis is displayed on the display unit 50.

FIG. 7 illustrates an example of such a cross table analysis display where the EIT event referenced by an ETT instance does exist. In this example, the user has selected, e.g., via the GUI 60, the ETT instance with an event id 260, causing that ETT instance and the corresponding event in the EIT to be highlighted in yellow. Here, if the referenced event did not exist in the corresponding EIT-k instance, this could be represented by a pseudo-event with red border appearing in the EIT-k instance in the same or similar way as the above discussed cross table analysis displays. If the referenced EIT-k instance did not exist at all, this could be represented by a pseudo-EIT-k instance with red border appearing in the display along with the EIT-k instances that are actually present. Other examples are possible.

Tables vs. EPG Display

Conventionally, it is often difficult to understand what is happening with EPG-related data by looking at displays showing the PSIP/PSI tables alone. A display that shows an EPG-like display, with linkages from events in that display to the tables that provide the information for the entries, can often shed considerable light on the situation. That is, advantages are added to the present invention by adding an EPG-style grid display of channels and events, and using the same kind of highlighting to show linkages between items in the EPG-style display and the tables and blocks of data that provide information for it. For example, if an event in the EPG-style display is selected, then that event can be highlighted, the block representing that event in the appropriate EIT-k can be highlighted, and the corresponding ETT instance can be highlighted according to an embodiment of the present invention. This analysis is carried out by the cross table analyzer 40 and the analysis result is output and displayed on the display unit 50.

FIG. 8 illustrates an example of such a cross table analysis display where the user has selected (e.g., via the GUI 60 and a known user input means such as a remote controller) an event in the EPG, causing the event in the EPG and the associated event block in the EIT and the associated ETT instance all to be highlighted in yellow. Similarly, the user can select the EIT event or the ETT instance, and obtain the same or similar highlighting. Other examples are possible.

DCCT vs. VCT Consistency

Each test in a DCCT references a dcc from channel number and a dcc to channel number. Both of these virtual channel numbers must appear in the VCT, or the test is invalid and will be ignored by a receiver. According to an embodiment of the present invention, this can be analyzed by the analyzer 40 and shown graphically on the display unit 50 by displaying a window that represents the DCCT, with blocks inside it that represent the directives of the DCCT, and allowing a user to select any directive in the DCCT to highlight that directive and the two channels in the VCT referenced by the directive. If one or both of these channels do not exist in the VCT, they can be represented by pseudo-channels outlined in red or some other color or fashion in the same or similar manner as the above discussed cross table analysis displays.

Version Number Consistency

The MGT gives the version number of the VCT, RRT, DCCT, DCCSCT, channel ETT, and each DET-k, EIT-k and ETT-k in the broadcast stream. This implies two types of consistency conditions that can be checked by the analyzer 40. First, all instances of each EIT-k are checked to make sure that they have the same version number; all instances of each DET-k are checked to make sure that they have the same version number; all instances of each event ETT-k are checked to make sure that they have the same version number; all instances of each data ETT-k are checked to make sure that they have the same version number; and all instances of the channel ETT are checked to make sure that they have the same version number. Second, the actual version number of each table listed in the MGT must be the same as the version number given in the MGT for the table and thus, these version numbers are checked by the analyzer 40.

The result of this analysis is output and displayed on the display unit 50 in the same or similar manner as the above discussed cross table analysis displays. For instance, inconsistent version numbers can be illustrated by a diagram that shows the MGT along with any tables that have version numbers not matching the ones the MGT gives for them, with the version numbers highlighted (e.g., in some color) to show the inconsistency.

Consolidated View

In accordance with the same or alternative embodiment of the present invention, a single consolidated view showing the relationships across the entire set of PSIP/PSI tables that contain programming information is provided. Various examples depicting the consolidated views of the cross table analysis displays will be discussed by referring to FIGS. 9-13.

FIG. 9 is an example of a cross table analysis display providing a high level indication (consolidated view) of the checked status of tables by painting a color for a good state (e.g., black) and an alert state (e.g., red) according to an embodiment of the present invention. The good state means that there was no consistency or other error with that table, whereas the alert state may mean that a consistency or other type of error was discovered for that table. This scheme is highly useful because it provides an overview of the status of each table in one display, thereby allowing the user to selectively check into any table with the alert state if the user desires. For instance, the boxes next to the tables can be checked by the user, which in turn causes the checked tables to expand so that the user can see the relevant data in the checked tables. Other schemes can be used to indicate the status of each table and to expand the desired tables selectively.

Figure 10:
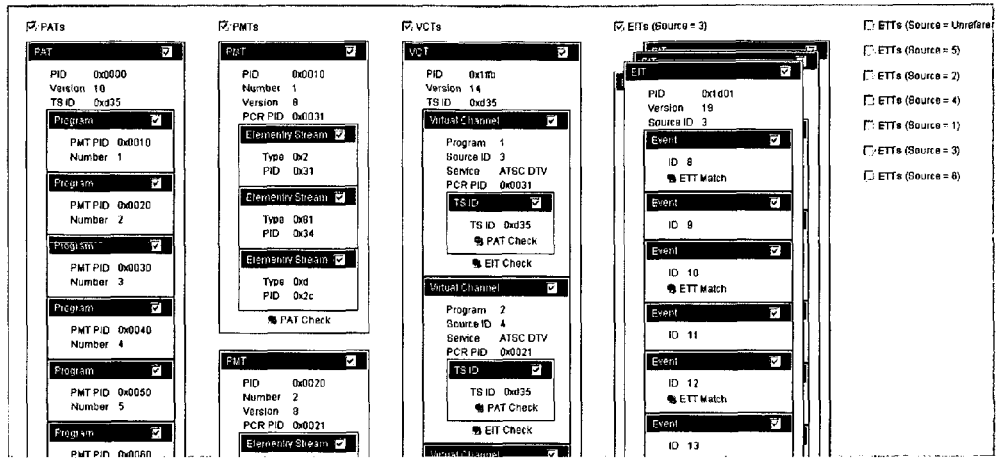

As one example, when certain boxes next to the table are checked (i.e., when the high level indicators are expanded), the selected tables and the cross-referenced information are displayed in the column format as shown in FIG. 10. The title bars on the expanded view can be used to traverse down into to the table to find the errors. In this example, there are two states for the title bar color: a missing state (red) and a detection state (blue). Other types of states or a different number of states may be used. The detection state means that an instance of that table was found. The missing state means that another table is referencing that table and it does not exist, an example of which is shown in FIG. 12.

In FIG. 10, the title bar text is also color coordinated to display alert states; however, any other scheme can be used to provide this function. In this example, the non-alert state for the title text is in white. The alert state is in red when one of the sub elements in the table is either missing or does not match the information correctly from another table.

All title bars are also collapsible to make it easier to shrink down unneeded information to take up less real space on the GUI.

Figure 11:
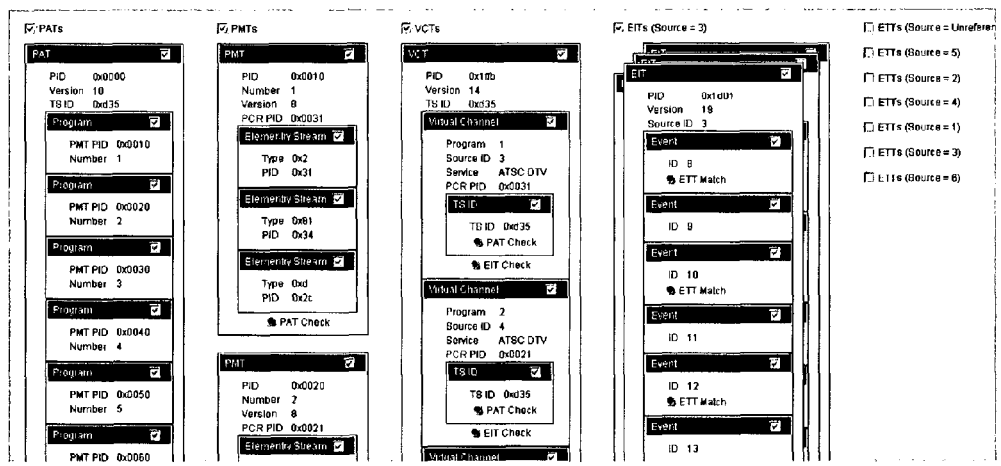

When the tables are expanded, moving the mouse over the data will highlight (in the figures shown, highlight color is yellow) other tables where the data is correlated. In FIG. 11, it is shown that the mouse is on top of the top PMT, which is indicated with the yellow highlight. However, other schemes instead of highlighting may also be used. Also, a different color or multiple colors may be used in highlighting. This motion highlights a sub element in the PAT and the VCT.

As discussed above, the link from the PMT to the PAT is the PID. An element in the PAT describes which PID the PMT will be on. If a PMT occurred that was not in the PAT, that highlighted box (the first element in the PAT) in FIG. 11 would have a red title bar and red outline to indicate this inconsistency.

In one embodiment of the present invention, the highlighting occurs whenever the mouse is moved over an element (or table) that references another element (or table) on the cross table analysis (CTA).

FIG. 12 displays an EIT that has referenced an ETT, but ETT does not exist in the transport stream. The red title bar (for the ETT) is an indicator that this table does not exist. The two highlighted elements are the missing ETT and the element in EIT that detected the error. The title text in EIT element that is highlighted is red. This indicates an error, but, since the title is blue, it means that element exists. The EIT text is orange, indicating that a sub element has an error associated with it.

FIG. 13 illustrates another example of a consolidated view of a cross table analysis according to an embodiment of the present invention. In FIG. 13, it depicts the relationships between the PATs, PMTs, VCTs, EITs and ETTs and indicates the results of the consistency check(s) between these tables in one viewing. In this example, the user has selected one of the virtual channels in the VCT, and yellow highlighting is used to show the elements in the diagram that are linked to this virtual channel.

One of many advantages of the present invention is that it allows a user to almost instantaneously identify specific problems with one or more tables by merely viewing the cross table analysis displays.

In all these embodiments, any color(s), graphics or other visual and/or audible schemes (e.g., different fonts, shapes, sizes, etc.) can be used to display or communicate (e.g., audibly) the various cross table information discussed above.

As an alternative to the use of a mouse, any other input device such as a keyboard, electronic stylus, touch-sensitive unit, etc., can be used.

Also, although the above discussion of the present invention focused on the MPEG-2 Systems Standard and the ATSC PSIP Standard, the invention is equally applicable to other similar or equivalent standards, or different versions or modifications of the existing standards as long as the cross table analyzer 40 is configured to check for the relationship between the tables according to these standards.

All aspects of the present invention can be implemented using known hardware and/or software. Any existing computer programming language can be used to implement the invention. The present invention can also be integrated into a larger broadcast system.

Some of the areas of applicability of the present invention include, but are not limited to, DTV terrestrial broadcasters to check to make sure their PSIP generator is correctly encoding tables; cable head ends to make sure that signals they receive off the air have the correct PSIP carried in them, and that they are regenerating/adding in correct PSIP before sending it out for consumer viewing; PSIP encoder manufactures to make sure that their encoders are generating PSIP within the correct standards; and consumer/industrial DTV PC card manufactures and set top box manufactures (e.g., LG Electronics Inc.) to debug their PSIP table receivers by making sure that the valid streams generate the desired results.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of providing a cross table analysis display in a digital broadcast system, the method comprising:
    accessing, by a testing device located upstream of an end-user digital television receiver, at least two transmitted metadata tables included within one transmitted MPEG-2 Transport broadcast stream;
    performing a cross table analysis directly on syntax and field values of the at least two transmitted metadata tables included within the broadcast stream to determine consistencies and inconsistencies between the syntax and field values within the at least two transmitted metadata tables;
    displaying, in the testing device, a result of the cross table analysis of the syntax and field values within the at least two transmitted metadata tables using a user-selectable graphical user interface without discarding inconsistencies in the syntax and field values between the at least two transmitted metadata tables, thereby a user can visually determine the consistencies and inconsistencies between the metadata tables; and
    selectively automatically highlighting relationships of the field values among the analyzed metadata tables only when any one of the analyzed metadata tables or groupings of analyzed metadata tables have been, selected by the user, wherein the testing device uses the syntax and field values of the user selected metadata table as a reference to highlight syntax and field values of the other analyzed metadata tables based on the cross table analysis;
    wherein the transmitted metadata tables include tables from at least one of program specific information (PSI) tables, and program and system information protocol (PSIP) tables, wherein the displaying the result of the cross table analysis step displays the transmitted metadata tables in an expanded form including names of individual metadata tables, fields and field values within the individual metadata tables on a single display screen of the graphical user interface such that the user can view all of the analyzed metadata tables on the single display screen, and
    wherein the selectively automatically highlighting step automatically highlights a selected first transmitted metadata table and/or syntax/field within the first transmitted metadata table with a first color and all other transmitted metadata tables and/or syntax/field within the other transmitted metadata tables that are different than the selected first transmitted metadata table, have a relationship to the selected first transmitted metadata table and that have a consistency with the selected first transmitted metadata table with the first color and automatically highlights said other transmitted metadata tables and/or field within the other transmitted metadata tables that have an inconsistency with the selected first transmitted metadata table with a second color different than the first color to emphasize the consistencies and inconsistencies with the displayed metadata tables and incorrect and missing links between the displayed metadata tables in the single display screen.

2. The method of claim 1, wherein the PSI tables include a program association table (PAT) and a program map table (PMT).

3. The method of claim 1, wherein the PSIP tables include a master guide table (MGT), a system time table (STT), a virtual channel table (VCT), an event information table (EIT), a data event table (DET), an extended text table (ETT), a directed channel change table (DCCT), a DCC selection code table (DCCSCT), and a rating region table (RRT).

4. The method of claim 1, wherein the displaying the result of the cross table analysis step displays the transmitted metadata tables in either a pair-wise table view or a consolidated view of all the transmitted metadata tables.

5. The method of claim 4, wherein, when the displaying step displays the result of the cross table analysis of the transmitted metadata tables in the pair-wise table view, the pair-wise table view indicates a relationship between transmitted metadata tables in one of the following table pairs:
   a program association table (PAT) and a program map table (PMT);
   a PAT and a virtual channel table (VCT);
   a PMT and a VCT;
   an extended text table (ETT) and a VCT;
   a data event table (DET) and a VCT;
   an ETT and an event information table (EIT);
   an ETT and a DET; and
   a directed channel change table (DCCT) and a VCT.

6. The method of claim 1, wherein the displaying the result of the cross table analysis step displays whether or not version numbers in the transmitted metadata tables match.

7. The method of claim 1, further comprising: selectively expanding at least a portion of the displayed result based on a user input.

8. A computer program product embodied on at least one non-transitory computer-readable medium, for providing a cross table analysis display in a digital broadcast system, the computer program product comprising computer-executable instructions for:
   accessing, by a testing device located upstream of an end-user digital television receiver included in the digital broadcast system, at least two transmitted metadata tables included within one transmitted MPEG-2 Transport broadcast stream;
   performing a cross table analysis directly on syntax and field values of the at least two transmitted metadata tables included within the broadcast stream to determine consistencies and inconsistencies between the syntax and field values within the at least two transmitted metadata tables;
   displaying, in the testing device, a result of the cross table analysis of the syntax and field values within the at least two transmitted metadata tables using a user-selectable graphical user interface without discarding inconsistencies in the syntax and field values between the at least two transmitted metadata tables, thereby a user can visually determine the consistencies and inconsistencies between the field values within the metadata tables; and
   selectively automatically highlighting relationships of the field values among the analyzed metadata tables only when any one of the analyzed metadata tables or groupings of analyzed metadata tables have been selected by the user, wherein the testing device uses the syntax and field values of the user selected metadata table as a reference to highlight syntax and field values of the other analyzed metadata tables based on the cross table analysis;
   wherein the transmitted metadata tables include tables from at least one of program specific information (PSI) tables, and program and system information protocol (PSIP) tables,
   wherein the computer-executable instructions for displaying the result of the cross table analysis display the transmitted metadata tables in an expanded form including names of individual metadata tables, fields and field values within the individual metadata tables on a single display screen of the graphical user interface such that all of the analyzed metadata tables on the single display screen are viewable, and
   wherein the selectively automatically highlighting instruction automatically highlights a selected first transmitted metadata table and/or syntax/field within the first transmitted metadata table with a first color and all other transmitted metadata tables and/or syntax/field within the other transmitted metadata tables that are different than the selected first transmitted metadata table, have a relationship to the selected first transmitted metadata table and that do have a consistency with the selected first transmitted metadata table with the first color and automatically highlights said other transmitted metadata tables and/or field within the other transmitted metadata tables that have an inconsistency with the selected first transmitted metadata table with a second color different than the first color to emphasize the consistencies and inconsistencies with the displayed metadata tables and incorrect and missing links between the displayed metadata tables in the single display screen.

9. The computer program product of claim 8, wherein the PSI tables include a program association table (PAT) and a program map table (PMT).

10. The computer program product of claim 8, wherein the PSIP tables include a master guide table (MGT), a system time table (STT), a virtual channel table (VCT), an event information table (EIT), a data event table (DET), an extended text table (ETT), a directed channel change table (DCCT), a DCC selection code table (DCCSCT), and a rating region table (RRT).

11. The computer program product of claim 8, wherein the computer-executable instructions for displaying the result of the cross table analysis display the result of the cross table analysis of the transmitted metadata tables in either a pair-wise table view or a consolidated view of all the transmitted metadata tables.

12. The computer program product of claim 11, wherein, when the computer-executable instructions for displaying the result of the cross table analysis display the result of the cross table analysis of the transmitted metadata tables in the pair-wise table view, the pair-wise table view indicates a relationship between tables in one of the following table pairs:
   a program association table (PAT) and a program map table (PMT);
   a PAT and a virtual channel table (VCT);
   a PMT and a VCT;
   an extended text table (ETT) and a VCT;
   a data event table (DET) and a VCT;
   an ETT and an event information table (EIT);
   an ETT and a DET; and
   a directed channel change table (DCCT) and a VCT.

13. The computer program product of claim 8, wherein the computer-executable instructions for displaying the result of the cross table analysis display whether or not version numbers in the transmitted metadata tables match.

14. The computer program product of claim 8, further comprising computer-executable instructions for:
   selectively expanding at least a portion of the displayed result based on a user input.

15. A system for providing a cross table analysis display in a digital broadcast system comprising:
   at least two transmitted metadata tables included within one transmitted MPEG-2 Transport broadcast stream accessed by a testing device located upstream of an end-viewer digital television receiver included in the digital broadcast system;

performing a cross table analysis directly on the syntax and field values of the at least two transmitted metadata tables included within the broadcast to determine consistencies and inconsistencies between the at least two transmitted metadata tables;

means for displaying, in the testing device, a result of the cross table analysis of the syntax and field values within the at least two transmitted metadata tables using a user-selectable graphical user interface without discarding inconsistencies in the syntax and field values between the at least two transmitted metadata tables, thereby a user can visually determine the consistencies and inconsistencies between the field values within the metadata tables; and selectively automatically highlighting relationships among the field values of the analyzed metadata only when any one of the analyzed metadata tables or groupings of analyzed metadata tables have been selected by the user, wherein the testing device uses the syntax and field values of the user selected metadata table as a reference to highlight syntax and field values of the other analyzed metadata tables based on the cross table analysis;

wherein the transmitted metadata tables include tables from at least one of program specific information (PSI) tables, and program and system information protocol (PSIP) tables, wherein the means for displaying the result of the cross table analysis displays the transmitted metadata tables in an expanded form including names of individual metadata tables, fields and field values within the individual metadata tables on a single display screen of the graphical user interface such that the user can view all of the analyzed metadata tables on the single display screen, and wherein the selectively automatically highlighting automatically highlights a selected first transmitted metadata table and/or syntax/field within the first transmitted metadata table with a first color and all other transmitted metadata tables and/or syntax/field within the other transmitted metadata tables that are different than the selected first transmitted metadata table, have a relationship to the selected first transmitted metadata table and that do have a consistency with the selected first transmitted metadata table with the first color and automatically highlighting said other transmitted metadata tables and/or field within the other transmitted metadata tables that have an inconsistency with the selected first transmitted metadata table with a second color different than the first color to emphasize the consistencies and inconsistencies with the displayed metadata tables and incorrect and missing links between the displayed metadata tables in the single display screen.

16. The system of claim 15, wherein the PSI tables include a program association table (PAT) and a program map table (PMT).

17. The system of claim 15, wherein the PSIP tables include a master guide table (MGT), a system time table (STT), a virtual channel table (VCT), an event information table (EIT), a data event table (DET), an extended text table (ETT), a directed channel change table (DCCT), a DCC selection code table (DCCSCT), and a rating region table (RRT).

18. The system of claim 15, wherein the displaying means for displaying the result of the cross table analysis displays the result of the cross table analysis of the transmitted metadata tables in either a pair-wise table view or a consolidated view of all the transmitted metadata tables.

19. The system of claim 18, wherein, when the displaying means for displaying the result of the cross table analysis displays the result of the cross table analysis of the transmitted metadata tables in the pair-wise table view, the pair-wise table view indicates a relationship between tables in one of the following table pairs:

a program association table (PAT) and a program map table (PMT);
a PAT and a virtual channel table (VCT);
a PMT and a VCT;
an extended text table (ETT) and a VCT;
a data event table (DET) and a VCT;
an ETT and an event information table (EIT);
an ETT and a DET; and
a directed channel change table (DCCT) and a VCT.

20. The system of claim 15, wherein the displaying means for displaying the result of the cross table analysis displays whether or not version numbers in the transmitted metadata tables match.

21. The system of claim 15, further comprising: means for selectively expanding at least a portion of the displayed result based on a user input.

* * * * *